Sept. 18, 1923.

J. A. HOLIFIELD 1,468,157

INHERENTLY REGULATED DYNAMOTOR

Filed Feb. 20, 1922

Inventor
J. A. Holifield.

Patented Sept. 18, 1923.

1,468,157

UNITED STATES PATENT OFFICE.

JOSEPH A. HOLIFIELD, OF MOBILE, ALABAMA, ASSIGNOR TO WHITE FUEL OIL ENGINEERING CORPORATION, OF NEW YORK, N. Y., A CORPORATION OF NEW YORK.

INHERENTLY-REGULATED DYNAMOTOR.

Application filed February 20, 1922. Serial No. 538,125.

*To all whom it may concern:*

Be it known that I, JOSEPH A. HOLIFIELD, a citizen of the United States of America, residing at Mobile, in the county of Mobile and State of Alabama, have invented certain new and useful Improvements in Inherently-Regulated Dynamotors, of which the following is a specification.

My invention relates to a dynamotor electric machine having its armature shaft extended to receive a power pulley or equivalent power transmission element and which is convertible to any one of the following uses, to-wit:—

(1) A dynamotor with, if desired, a hand controlled rheostat to vary the current and line voltage.

(2) A constant voltage externally driven dynamo.

(3) A direct current motor; and (4) A welding arc current generator adapted to be driven by any available power and inherently self regulated.

My invention contemplates the use of the subject type of dynamotor which forms the subject matter of pending application, Serial No. 503,216, wherein I employ twin poles which are so wound and disposed as to induce by the sum of their magnetic influence a current flow in the armature proportionate to the requirements at the work circuit and capable of instantaneous change to accommodate itself to variations of resistance in said circuit. It is of vital importance, in obtaining the instantaneous regulation, that this should be obtained independently of external regulators and as a result of magnetic influences which are directly responsive to the work circuit and which control the generation of current in the dynamotor. More simply expressed, my apparatus contemplates causing the work circuit to directly draw from the source of electrical energy only that which is required to maintain it at highest efficiency and it is, therefore, in contra-distinction to those systems which generate the current and then by separate agencies seek to control its delivery to the work circuit.

In my development of the type of dynamotor above described, and particularly in adapting it for maximum service and utility for vessels and sawmill work, I have conceived the idea that by extending the armature shaft of an inherently regulated dynamotor to receive a power pulley or equivalent transmission element, I could readily convert the type of dynamotor described to serve the various purposes above outlined.

While my invention is capable of various modifications in respect of the manner of winding the twin poles, I have sought in the accompanying drawings to illustrate sufficiently typical embodiments of my invention to make clear to those skilled in the art the manner in which my invention may be produced and operated.

Referring to the drawings:—

Similar reference numerals refer to similar parts throughout the drawings.

The dynamotor comprises a main frame 1 having end bearing brackets 2 in which the armature shaft 3 is suitably journaled with one end overhung to receive a power pulley 4 or equivalent power transmission element.

Figure 1:
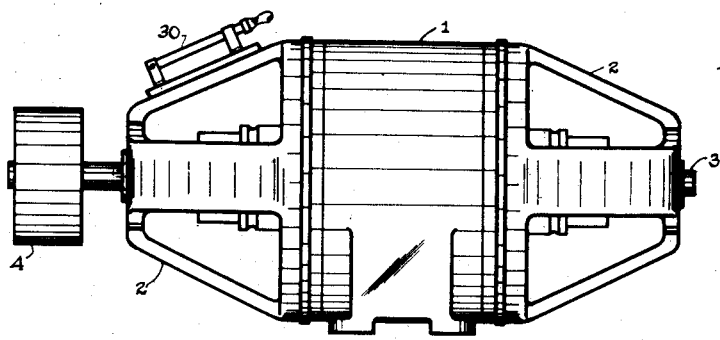
Fig. 1 is a side elevation of my convertible dynamotor.
Figure 2:
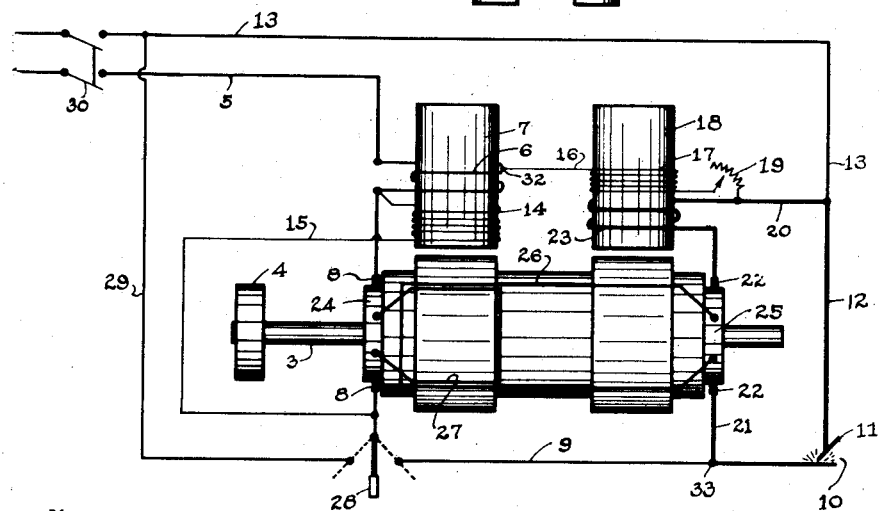
Fig. 2 is a diagrammatic view illustrating the same machine electrically driven and showing it convertible into a D. C. motor or an arc current generator.

Referring to Fig. 2, 5 is the positive main line feeder having in series therewith a main coil 6 on the constantly excited pole 7. The circuit 5 is connected across the brushes 8 and continues along the circuit 9 to the work, which may be a welding arc formed by manually controllable welding electrodes 10 and 11. From the work the current continues along the circuit 12 to the negative main line 13. A boosting field coil 14 is included in a circuit 15 derived from the circuit 5 and connected thereto in shunt about the brushes 8. The positive current is branched from the circuit 5 by a line 16, which includes a boosting coil 17 on the variably excited pole 18, this circuit including a rheostat 19 and connecting to a circuit 20 returning to the negative line 13. From the circuit 9 I branch a circuit 21 connected across the armature brushes 22 and having in series therewith a coil 23 about the variably excited pole 18, which circuit thence returns over circuit 20 to the negative main.

The armature comprises a motor commutator 24 with which the brushes 8 co-act, and a generator commutator 25 with which the brushes 22 co-act. The armature windings 26 from the generator commutator 25 pass under both sets of poles 7 and 18 while the armature windings 27 from the motor commutator 24 extend only under the constantly excited set of poles 7. I interpose in the main line 5 between the motor commutator and the generator tap 21 a double throw switch 28 which is adapted to connect this main line 5 either with the circuit 9, as shown, or with a circuit 29 returning direct to the negative main line 13. By this arrangement the winding 6 can either be connected through the wire 29 to the main line or through the arc. I provide a switch 30 in the main power circuit 5, 13, and when this is open all electrical current from the power mains is cut off from the dynamotor.

Figure 3:
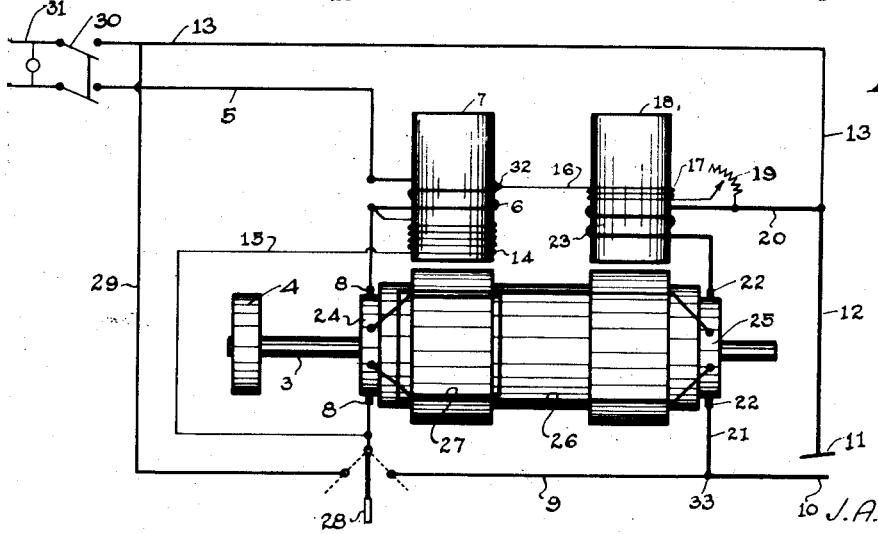
Fig. 3 is a diagrammatic illustration of the dynamotor as externally power driven showing its convertibility into a welding machine or a constant potential dynamo for generating current for a lighting circuit.

In Fig. 3 all of the circuit connections and elements as hereinbefore described are shown with the exception that I do not illustrate a power circuit, but utilize the switch 30 to connect the circuits 5 and 13 with a light circuit 31, it being contemplated that the dynamotor shall be externally power driven by means of its pulley 4.

Referring to the machine as an electrically driven unit (Fig. 2) when functioning as an inherently regulated arc welding current generator, its operation is as follows. Assuming the arc to be open and the switch 28 thrown to cause the current to flow through the arc, the main line positive current enters over the circuit 5 and flows to the branch point 32, from which a small part of the current passes through the coil 17 and through the rheostat 19 and out over circuits 20 and 13. The main current from the branch point 32 flows across the motor or exciting commutator 24 and over switch 28 to the circuit 9 and thence to the branch point 33, whence the current flows over circuit 21 across the generator commutator 25 and through coil 23 and out over the circuits 20 and 13. This flow of the current will bring the dynamotor quickly up to speed with the welding arc ready for service as the current flow in all windings on both poles will produce current flow in the same direction in both of the armature coils. On striking the arc, the main line current from the branch point 33 continues across the arc and out over circuits 12 and 13, and the generator as it functions creates a bucking current which joins with the main current at the junction point 33, passing through the arc and returning over circuit 20 and in a reverse direction through the coils 23 of the pole 18. This reverses the polarity of the set of poles 18 and acts to set up in the armature conductors 26 a bucking current opposed to the current induced in said conductors by the action of the constantly excited poles 7. It is the counteraction between the opposing magnetisms of the poles 7 and 18 which effects an automatic, inherent and instantaneous regulation of the current generated, maintaining voltage always in direct proportion to the requirements at the arc because the magnetism of the variably excited set of poles 18 is always directly responsive to variations of resistance in the arc and thus the strength of the bucking current it induces in the armature conductors is likewise directly responsive to such variations. It follows, therefore, that as the arc resistance increases, the magnetism of the pole 18 will tend to weaken which will lower the bucking current and allow the current generated by the constantly excited field to replace the loss due to the increased resistance in the arc, thus maintaining a substantially constant current in the arc. When the machine is connected through the arc, there is an increased tendency to fluctuate owing to variations in speed and the inertia of the armature. These variations however, can be overcome by shifting the switch 28 to the position in which current will flow through the wire 23 which will separate the motor from the dynamo and therefore the main line current will not enter the arc circuit. This gives a smoother and more uniform regulation.

To convert the machine for use as a direct current motor, it is only necessary to open the arc circuit, thereupon the machine may be run as a direct connected motor driving its pulley 4.

To convert the machine for welding purposes to be driven by external power, it is only necessary to drive the armature by the pulley 4, as shown in Fig. 3, whereupon the operation is the same as described in connection with Fig. 2.

As described in connection with Fig. 2, this power driven machine may be operated connected in either manner described. In both Figs. 2 and 3 the dynamotor is both self excited and separately excited by the action of the constantly excited poles 7 on the armature conductors 27. To utilize the device for the purpose of generating lighting current, it is only necessary to open the arc and close the switch 30 in Fig. 3 to connect the lighting circuit 31 with the circuits 5 and 13, whereupon the machine will function as a constant potential D. C. generator for such light circuit.

Though I have described with great particularity the details of the embodiment of the invention herein shown, it is not to be construed that I am limited thereto as changes in arrangement and substitution of

Having thus described my invention, what I claim as new and desire to secure by Letters Patent, is:—

1. In a dynamo electric machine, an armature having two commutators, two sets of poles disposed in different transverse planes through the armature and arranged to span substantially simultaneously a conductor from one commutator, an exciting conductor from the other commutator which is spanned by but one set of poles, means to constantly excite said latter set of poles, a series exciting winding for the other set of poles, and means to convert said dynamo electric machine from an electrically driven unit to a mechanically driven unit, and vice versa.

2. In a dynamo electric machine, an armature having two commutators, two sets of poles disposed in different transverse planes through the armature and arranged to span substantially simultaneously a conductor from one commutator, an exciting conductor from the other commutator which is spanned by but one set of poles, means to constantly excite said latter set of poles, and an additional exciting winding on the latter set of poles disposed to boost with respect to the constantly excited field, a rheostat to regulate the flow of current in said additional winding, and means to convert said dynamo electric machine from an electrically driven unit to a mechanically driven unit, and vice versa.

3. In a self regulating dynamotor convertible for various uses, an armature having an exciting commutator and a generator commutator, two sets of poles subtending different circumferential zones of the commutator, an armature conductor leading from the generator commutator and passing substantially simultaneously under both sets of poles, an exciting winding leading from the exciting commutator and extending only under the adjacent set of poles, means to constantly excite the latter poles, means to variably excite the other poles responsive to the resistance in the work circuit, and circuit connections including a switch means adapted to cause the current through the winding of the first set of poles to selectively pass directly back to the current source and through the work circuit.

4. In a self regulating dynamotor electric machine convertible for various uses, an armature having its shaft extended to receive a mechanical driving element, and having two commutators, two sets of poles disposed lengthwise of the armature, armature conductors passing substantially simultaneously under both sets of poles, exciting armature windings passing only under one set of poles, means to constantly excite said latter set of poles, and means to variably excite the other set of poles responsive to varying resistance in the work circuit.

In testimony whereof I affix my signature.

JOSEPH A. HOLIFIELD.

Witness:
NOMIE WELSH.